(12) United States Patent
Itou

(10) Patent No.: US 10,831,354 B2
(45) Date of Patent: Nov. 10, 2020

(54) DISPLAY APPARATUS AND DISPLAY METHOD

(71) Applicant: NTT DOCOMO, INC., Tokyo (JP)

(72) Inventor: Takurou Itou, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/464,981

(22) PCT Filed: Nov. 30, 2017

(86) PCT No.: PCT/JP2017/042961
§ 371 (c)(1),
(2) Date: May 29, 2019

(87) PCT Pub. No.: WO2019/069473
PCT Pub. Date: Apr. 11, 2019

(65) Prior Publication Data
US 2020/0233562 A1 Jul. 23, 2020

(30) Foreign Application Priority Data

Oct. 4, 2017 (JP) ................................ 2017-194621

(51) Int. Cl.
*G06F 3/0484* (2013.01)
*G06F 3/0487* (2013.01)
(52) U.S. Cl.
CPC ........ *G06F 3/04842* (2013.01); *G06F 3/0487* (2013.01)
(58) Field of Classification Search
CPC .. G06F 3/04842; G06F 1/1677; G06F 3/0484; G09G 5/00
See application file for complete search history.

(56) References Cited

U.S. PATENT DOCUMENTS

2012/0081323 A1* 4/2012 Sirpal ................... G06F 3/017
345/173
2012/0229374 A1 9/2012 Kobayashi et al.
(Continued)

FOREIGN PATENT DOCUMENTS

EP 2241963 A1 10/2010
JP 09305259 A 11/1997
(Continued)

OTHER PUBLICATIONS

Extended European Search Report issued in corresponding European Patent Application No. 17927925.2 dated Jan. 9, 2020.
(Continued)

*Primary Examiner* — Kevin M Nguyen
(74) *Attorney, Agent, or Firm* — MGK, LLC

(57) ABSTRACT

First screen display control unit displays an image of an app started by a starting operation corresponding to a first screen in a full-screen area of the first screen. For example, when operation for starting an app is performed on a startup image displayed on the first screen, first screen display control unit determines starting operation corresponding to the first screen has been performed, and displays the app image in the full-screen area. Second screen display control unit displays an image of an app started by a starting operation corresponding to a second screen in a full-screen area of the second screen. For example, when operation for starting an app is performed on a startup image displayed on the second screen, second screen display control unit determines starting operation corresponding to the second screen has been performed, and displays the app image in the full-screen area of the second screen.

10 Claims, 8 Drawing Sheets

(56) References Cited

U.S. PATENT DOCUMENTS

| | | | | |
|---|---|---|---|---|
| 2012/0250241 A1* | 10/2012 | Minemura | ............ | G06F 1/1616 |
| | | | | 361/679.21 |
| 2013/0113749 A1 | 5/2013 | Miyahara | | |
| 2015/0199125 A1 | 7/2015 | Tsukamoto et al. | | |
| 2017/0345389 A1* | 11/2017 | Funada | ................ | H04N 9/3135 |
| 2018/0061374 A1* | 3/2018 | Wygonik | .............. | G06F 3/0481 |

FOREIGN PATENT DOCUMENTS

| | | |
|---|---|---|
| JP | 2012027562 A | 2/2012 |
| WO | 2012039235 A1 | 3/2012 |

OTHER PUBLICATIONS

Decision of Refusal issued in corresponding Japanese Patent Application No. 2017-194621, dated Jul. 23, 2019.

"What are the correct answers on these two screens? I will teach you how to use 'MEDIAS W N-05E'"; https://andronavi.com/2013/04/262181; posted on Apr. 16, 2013.

Notice of Reasons for Refusal issued in corresponding Japanese Patent Application No. 2017-194621 dated Nov. 29, 2018 0.

International Search Report issued in corresponding PCT Application No. PCT/JP2017/042961 dated Jan. 16, 2018.

* cited by examiner

DISPLAY APPARATUS AND DISPLAY METHOD

TECHNICAL FIELD

The present invention relates to user interface technology.

BACKGROUND ART

JP 2012-27562A discloses a technique that appropriately arranges display areas when a plurality of the same application programs are started on multi-monitors.

SUMMARY OF INVENTION

In a display apparatus that has a small screen such as a smartphone, operations are typically performed in the state of single-task/single-window (window=image of an application), and when an application is newly started, only an image of the application is displayed on the screen. Recent years has seen display apparatuses that perform split-screen display in response to an operation for splitting a screen being performed after a plurality of applications are started, for example, but it is the current situation that this is inconvenient since operations for starting the plurality of applications, the operation for splitting the screen, and an operation for selecting applications to be displayed need to be performed.

Therefore, it is an object of the present invention to reduce inconvenience when images of two applications are to be displayed simultaneously.

In order to achieve the above object, embodiments of the present invention provide a display apparatus that includes a first screen, a second screen, and a first display control unit that displays an image of a first application on the first screen upon the first application being started, and displays an image of a second application on the second screen upon the second application being started.

The display apparatus may further include a second display control unit that displays at least one startup image for starting an application, and the first display control unit may display an image of an application that is started by a starting operation corresponding to the first screen as the image of the first application on the first screen, and display an image of an application that is started by a starting operation corresponding to the second screen as the image of the second application on the second screen.

The second display control unit may display a first startup image that is one of the at least one startup image on the first screen, and display a second startup image that is one of the at least one startup image on the second screen, and when a starting operation is made on the first startup image, the first display control unit may determine that the starting operation corresponding to the first screen has been made, and when a starting operation is made on the second startup image, the first display control unit may determine that the starting operation corresponding to the second screen has been made.

The display apparatus may further include a first casing that has the first screen, a second casing that has the second screen, and a joint portion that joins the first casing and the second casing in a foldable manner, and the second display control unit may display the at least one startup image when the first casing and the second casing are opened wider than a predetermined angle.

The display apparatus may further include an executing unit that executes an operation system that realizes a display control function that displays images of applications in a plurality of display areas, respectively, and does not display an image of a non-supporting application in the plurality of display areas when a non-support notification is received from the non-supporting application, the non-supporting application being an application that does not support display in the plurality of display areas, and the non-support notification indicating that the non-supporting application does not support display in the plurality of display areas, and when the non-supporting application is started, the first display control unit may perform control so as not to receive the non-support notification and display the image of the non-supporting application on the first screen or the second screen.

When an application associated with the first screen is started, the first display control unit may display an image of the application as the image of the first application on the first screen.

In a state where an image of an application is displayed on one of the first screen and the second screen, when a moving operation is performed by a user by indicating a position on the one screen and moving the indicated position from the one screen to another screen, the first display control unit may display the image on the other screen and no longer display the image on the one screen.

The display apparatus may further include a second display control unit that displays a startup image for starting an application on the one screen from which the image of the application has been moved by the moving operation.

Embodiments of the present invention also provide a display method implemented by a display apparatus that includes a first screen and a second screen, the method including a step of displaying an image of a first application on the first screen upon the first application being started, and displaying an image of a second application on the second screen upon the second application being started.

According to the present invention, it is possible to reduce inconvenience when images of two applications are to be displayed simultaneously.

DETAILED DESCRIPTION

Embodiment

Figure 1:
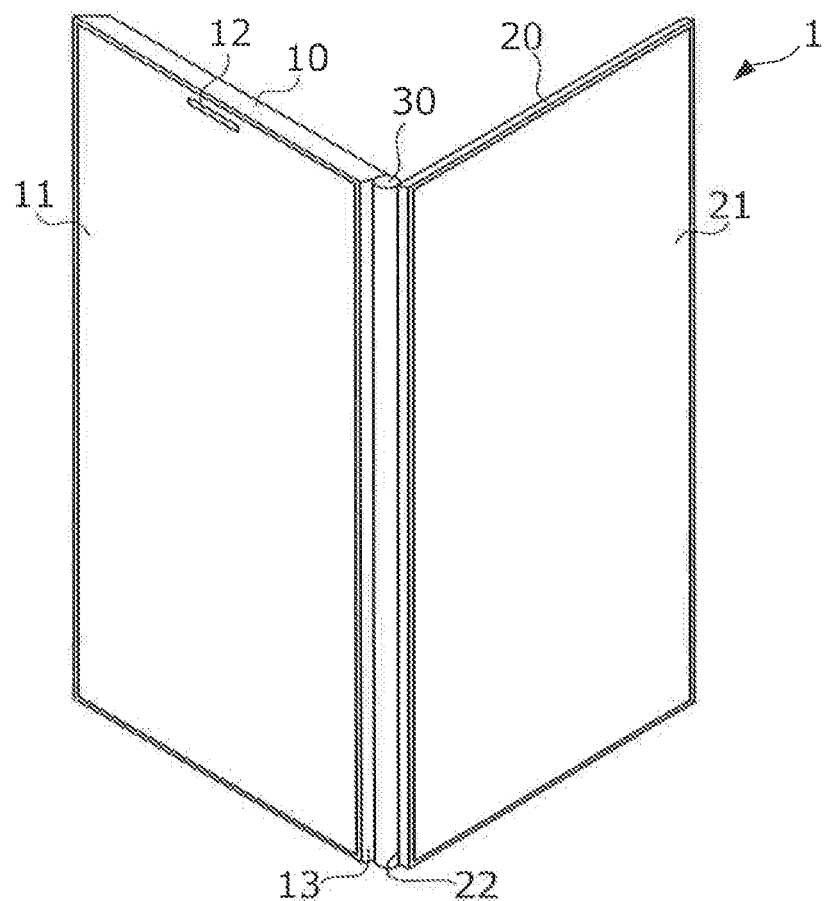
FIG. 1 is a diagram illustrating an appearance of a smartphone according to an embodiment.

FIG. 1 illustrates an appearance of smartphone 1 according to an embodiment. Smartphone 1 includes first casing 10, second casing 20, and hinge 30. Each of first casing 10 and second casing 20 is a casing that has the shape of a rectangular parallelepiped plate. First casing 10 has rectangular first screen 11 and second casing 20 has rectangular second screen 21. First screen 11 includes speaker port 12 from which the voice on the telephone is output. First screen 11 and second screen 21 are provided in different casings and are physically separated from each other.

Hinge 30 is a joint that rotatably joins first casing 10 and second casing 20. Hinge 30 includes a first rotary member and a second rotary member that are rotatable about a rotation shaft. End portion 13 of first casing 10 along a long side of first screen 11 is fixed to the first rotary member, and end portion 22 of second casing 20 along a long side of second screen 21 is fixed to the second rotary member. As a result of rotation of hinge 30, first casing 10 and second casing 20 rotate from a closed state where an angle between first screen 11 and second screen 21 is 0 degrees to an open state where the angle is 180 degrees.

Since each of first casing 10 and second casing 20 is plate-shaped, the angle between first screen 11 and second screen 21 is equivalent to an angle between first casing 10 and second casing 20. This angle will be referred to below as a "hinge angle". When the hinge angle is changed from 180 degrees to 0 degrees, first casing 10 and second casing 20 are folded. As described above, hinge 30 joins first casing 10 and second casing 20 in a foldable manner. Hinge 30 is an example of a "joint portion" in the present invention.

Figure 2:
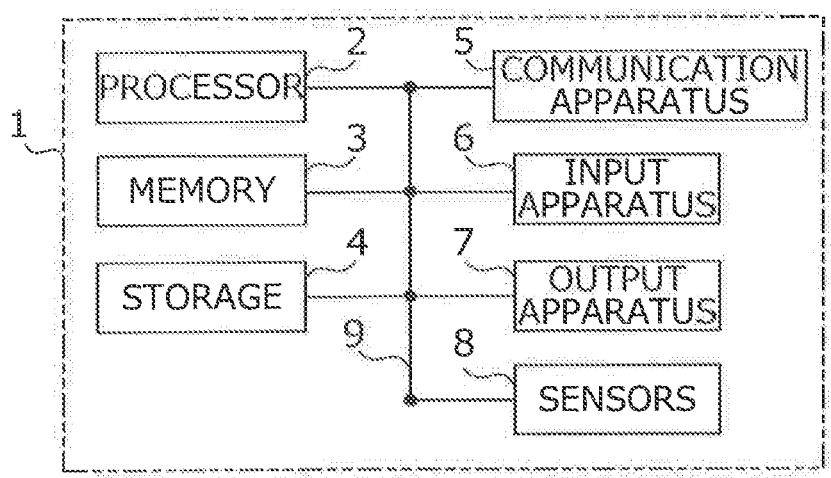
FIG. 2 is a diagram illustrating a hardware configuration of the smartphone.

FIG. 2 illustrates a hardware configuration of smartphone 1. Smartphone 1 is a computer that includes apparatuses such as processor 2, memory 3, storage 4, communication apparatus 5, input apparatus 6, output apparatus 7, sensor 8, and bus 9. Note that the term "apparatus" used here can be replaced with circuit, device, unit, or the like. One or more of the apparatuses may be included, or some of the apparatuses may be omitted.

Processor 2 controls the entirety of the computer by operating an operating system, for example. Processor 2 may be constituted by a central processing unit (CPU) that includes an interface with peripheral apparatuses, a control apparatus, an arithmetic apparatus, a register, and the like. Also, processor 2 reads out programs (program codes) that include the operating system (OS) and various applications (hereinafter also simply referred to as "apps"), software modules, data, and the like from storage 4 and/or communication apparatus 5 to memory 3 and executes various types of processing in accordance therewith.

Processor 2 executes as applications, a browser, a social networking service (SNS) app, an email app, a telephone app, a telephone directory app, a map app, a moving picture reproduction app, a camera app, and the like. The number of processors 2 that execute various types of processing may be one or two or more, and two or more processors 2 may execute various types of processing simultaneously or sequentially. Also, processor 2 may be mounted on one or more chips. Programs may be transmitted from a network via a telecommunication line.

Memory 3 is a computer readable recording medium, and may be constituted by at least one of a read only memory (ROM), an erasable programmable ROM (EPROM), an electrically erasable programmable ROM (EEPROM), and a random access memory (RAM), for example. Memory 3 may also be called a register, a cache, a main memory (main storage apparatus), or the like. Memory 3 is capable of storing the above-described programs (program codes), software modules, data, and the like.

Storage 4 is a computer readable recording medium and may be constituted by at least one of a hard disk drive, a flexible disk, a flash memory (for example, a card, a stick, or a key drive), and a magnetic strip, for example. Storage 4 may also be called an auxiliary storage apparatus. The above-described recording medium may be, for example, a database that includes memory 3 and/or storage 4, a server, or any other appropriate medium.

Communication apparatus 5 is hardware (transmission/reception device) for performing inter-computer communication via a cable network and/or a wireless network and is also called a network device, a network controller, a network card, or a communication module, for example. Input apparatus 6 is an input device (for example, a microphone, a switch, a button, a sensor, or the like) that receives input from the outside.

Output apparatus 7 is an output device (for example, a display, a speaker, an LED lamp, or the like) that realizes output to the outside. In smartphone 1, input apparatus 6 and output apparatus 7 integrally constitute a touch screen. Sensor 8 is a sensor for measuring the above-described hinge angle. For example, sensor 8 is a strain sensor that is provided on the hinge 30 such that the strain increases as the hinge angle increases.

Note that sensor 8 is not limited to the strain sensor, and any sensor may be used so long as the sensor outputs a value that indicates the hinge angle. The apparatuses such as processor 2 and memory 3 can access each other via bus 9 for communicating information. Bus 9 may be constituted by a single bus or a plurality of busses for different apparatuses.

Also, smartphone 1 may include hardware such as a microprocessor, a digital signal processor (DSP), an application specific integrated circuit (ASIC), a programmable logic device (PLD), and a field programmable gate array (FPGA), and some or all functional blocks may be realized by the hardware. For example, processor 2 may be implemented by at least one of the above-listed pieces of hardware.

Figure 3A:
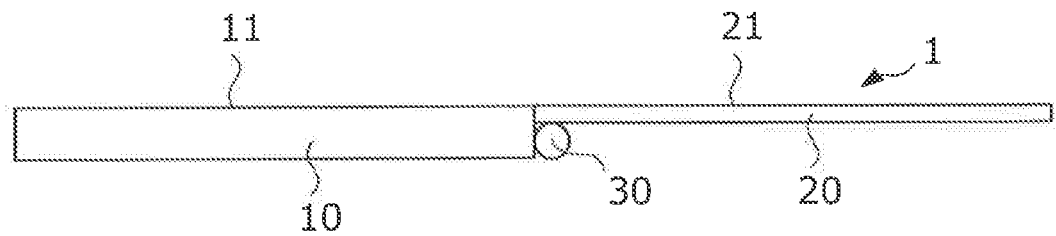
FIG. 3A is a diagram illustrating a state where the smartphone is folded.
Figure 3B:
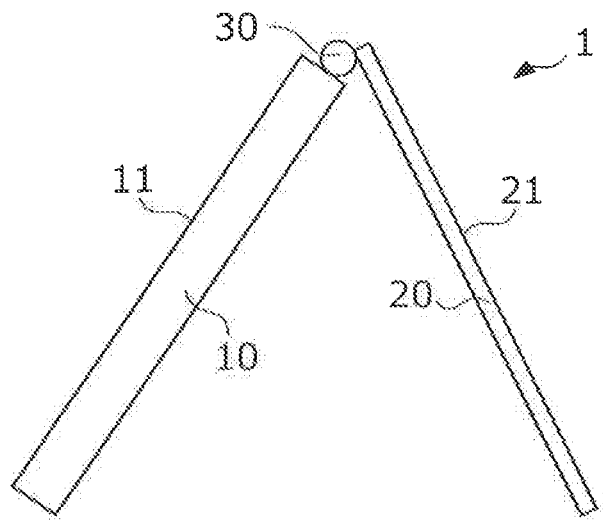
FIG. 3B is a diagram illustrating a state where the smartphone is folded.
Figure 3C:
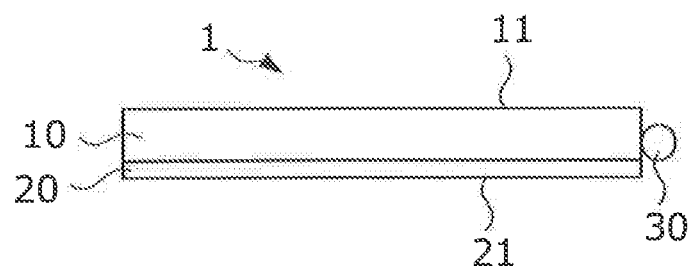
FIG. 3C is a diagram illustrating a state where the smartphone is folded.

FIGS. 3A, 3B, and 3C illustrate a state where smartphone 1 is folded. In FIGS. 3A, 3B, and 3C, smartphone 1 is viewed from the longitudinal direction of hinge 30. FIG. 3A illustrates smartphone 1 with a hinge angle of 180 degrees. When smartphone 1 is in a state where the hinge angle is 180 degrees, first screen 11 and second screen 21 lie straight (are contained in the same plane) and can also be used as a single large screen. Hereinafter, this state will be referred to as a "fully open style".

FIG. 3B illustrates smartphone 1 with a hinge angle of 60 degrees. In this state, it is possible to stand smartphone 1 with hinge 30 located on the upper side. Hereinafter, this state where smartphone 1 takes the form of a tent will be referred to as a "tent style". In the tent style, first screen 11 and second screen 21 face diagonally upward on opposite sides. FIG. 3C illustrates smartphone 1 with a hinge angle of 0 degrees.

In this state, first casing 10 and second casing 20 exactly overlap and form a rectangular parallelepiped shape. Hereinafter, this state will be referred to as a "fully closed style". In the fully closed style, images are only displayed on first screen 11 and the smartphone can be used as a regular single-screen smartphone. The display mode in this state will be referred to as a "single-side display mode". In contrast, in the tent style and the fully open style, images are displayed on both first screen 11 and second screen 21 and the smartphone can be used as a dual-screen smartphone. A mode in which images of different apps are respectively displayed on the two screens will be referred to as a "double-side individual display mode", and a mode in which an image of a single app is displayed across the two screens will be referred to as a "double-side whole display mode".

As a result of processor 2 of smartphone 1 executing programs and controlling respective units, a group of functions described below are realized.

Figure 4:
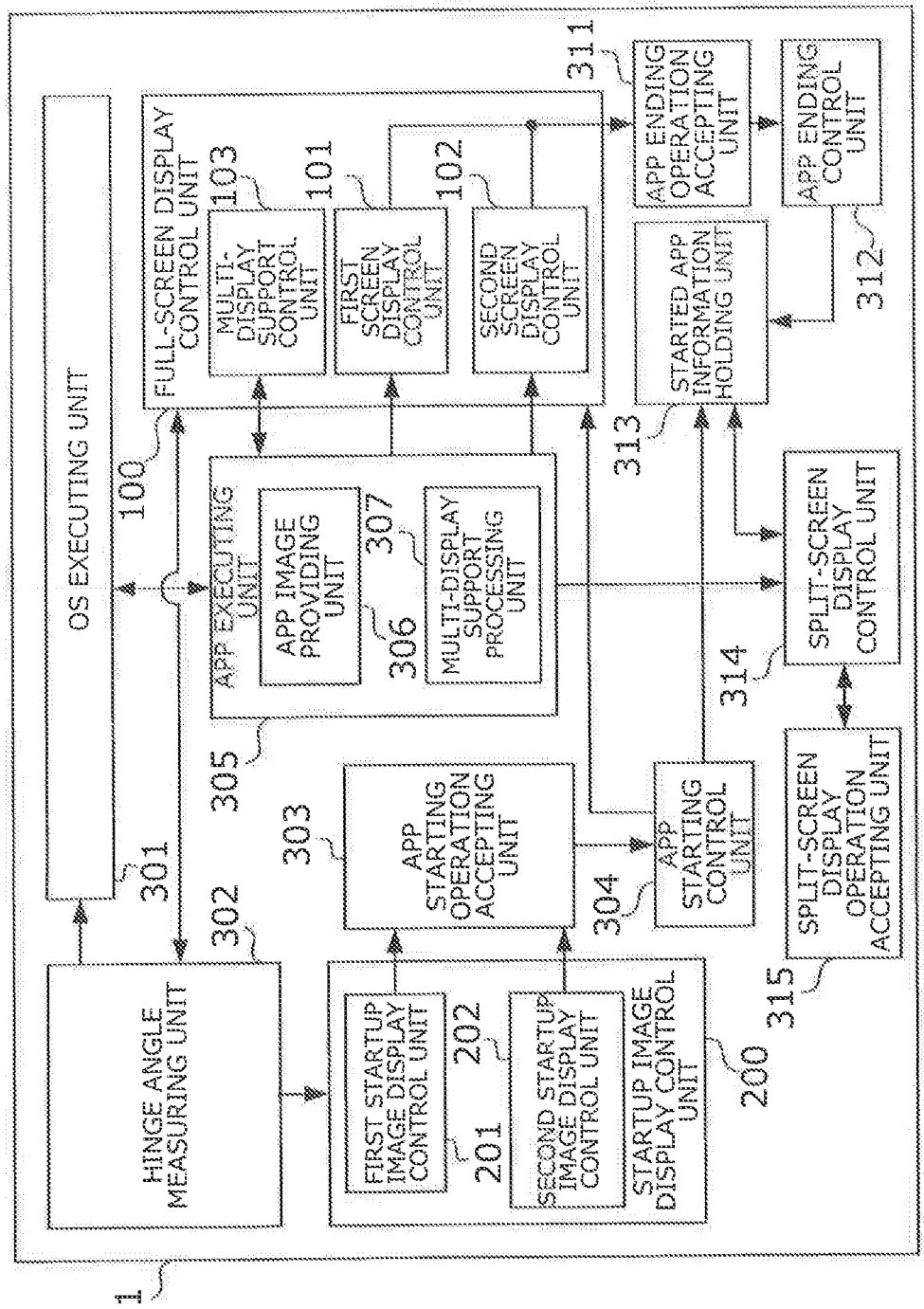
FIG. 4 is a diagram illustrating a configuration of functions realized by the smartphone.

FIG. 4 illustrates a configuration of functions realized by smartphone 1. Smartphone 1 includes full-screen display control unit 100 that is an example of a "first display control unit" in the present invention, and startup image display control unit 200 that is an example of a "second display control unit" in the present invention.

Also, smartphone 1 includes OS executing unit 301, hinge angle measuring unit 302, app starting operation accepting unit 303, app starting control unit 304, app executing unit 305, app ending operation accepting unit 311, app ending control unit 312, started app information holding unit 313, split-screen display control unit 314, and split-screen display operation accepting unit 315.

OS executing unit 301 is a function that executes the OS and is an example of an "executing unit" in the present invention. As a result of OS executing unit 301 executing the OS, various functions (copy function, delete function, and the like) included in the OS can be used and other functions illustrated in FIG. 4 can be realized. Hinge angle measuring unit 302 measures the above-described hinge angle, that is, the angle between first casing 10 and second casing 20 based on output of sensor 8 illustrated in FIG. 2. Hinge angle measuring unit 302 supplies the measured hinge angle to startup image display control unit 200.

Startup image display control unit 200 displays a startup image for starting applications in a full-screen area. The full-screen area referred to herein means the entire display area of first screen 11 or the entire display area of second screen 21.

Figure 5A:
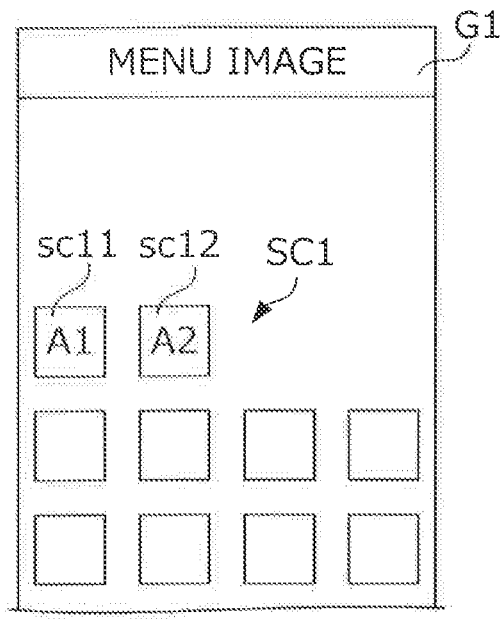
FIG. 5A is a diagram illustrating examples of startup images.
Figure 5B:
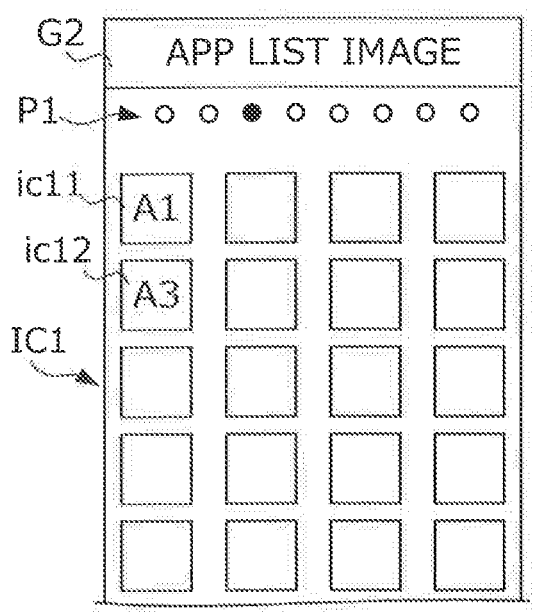
FIG. 5B is a diagram illustrating examples of startup images.

FIGS. 5A and 5B illustrate examples of startup images. FIG. 5A illustrates menu image G1 that is one of startup images. FIG. 5B illustrates app list image G2 that is one of startup images.

Menu image G1 displays shortcut group SC1 that includes shortcut sc11 for app A1 and shortcut sc12 for app A2. A shortcut is an operation image for accepting an operation for starting an app. Menu image G1 also displays a list display button for displaying app list image G2, and app list image G2 is displayed in response to an operation being performed on the list display button.

App list image G2 displays icon group IC1 that includes icon ic11 of app A1 and icon ic12 of app A3 and page image P1 that indicates the displayed page (in this example, it is indicated that the third page among eight pages is displayed). An icon is an operation image for accepting an operation for starting an app, an operation for creating a shortcut for an app, an operation for uninstalling an app, and the like.

Startup image display control unit 200 includes first startup image display control unit 201 and second startup image display control unit 202. First startup image display control unit 201 displays a startup image in the full-screen area of first screen 11. For example, in the state of single-side display mode (the state of fully closed style), first startup image display control unit 201 initially displays menu image G1 in the full-screen area of first screen 11, and in response to an operation being performed on the list display button, displays app list image G2 in the full-screen area of first screen 11.

Second startup image display control unit 202 displays a startup image in the full-screen area of second screen 21. In the state of double-side individual display mode, first startup image display control unit 201 displays menu image G1 in the full-screen area of first screen 11, and second startup image display control unit 202 displays app list image G2 in the full-screen area of second screen 21. Menu image G1 is an example of a "first startup image" in the present invention, and app list image G2 is an example of a "second startup image" in the present invention. The present embodiment is configured such that menu image G1 is kept from being displayed on both screens and app list image G2 is kept from being displayed on both screens.

Startup image display control unit 200 displays these startup images when first casing 10 and second casing 20 are opened wider than a predetermined angle (that is, when the hinge angle exceeds a predetermined angle). For example, in a case where menu image G1 is displayed on first screen 11 in the state of fully closed style, second startup image display control unit 202 displays app list image G2 on second screen 21 when the hinge angle exceeds the predetermined angle.

In a case where menu image G1 is not displayed on first screen 11 in the state of fully closed style, first startup image display control unit 201 displays menu image G1 on first screen 11 and second startup image display control unit 202 displays app list image G2 on second screen 21 when the hinge angle exceeds the predetermined angle. Therefore, the user can perform an operation for starting an app by merely opening smartphone 1.

When a tap operation is performed on shortcut sc11 in menu image G1, app starting operation accepting unit 303 accepts this operation as a starting operation of app A1 (operation for starting the app). Upon accepting the starting operation, app starting operation accepting unit 303 supplies, to app starting control unit 304, an app identification (ID) for identifying app A1 for which the starting operation was accepted. App starting control unit 304 reads programs, data, parameters, and the like relating to app A1 identified using the supplied app ID, deploys the programs, data, parameters, and the like in a memory, and starts app A1.

When a tap operation is performed on icon ic11 in app list image G2, app A1 is started similarly to when shortcut sc11 is tapped, and when a tap operation is performed on icon ic12, app A3 is started. Further, when a long-press operation is performed on icon ic11, for example, a shortcut creation button and an uninstall button are displayed. When the shortcut creation button is tapped, a shortcut for app A1 is added to the menu image by OS executing unit 301, and when the uninstall button is tapped, app A1 is uninstalled by OS executing unit 301.

When an app is started by app starting control unit 304, app executing unit 305 is realized by the app. App executing unit 305 executes processing related to the started app. For example, in the case of a browser, app executing unit 305 executes processing for acquiring a web page from a web server, and, in the case of a moving picture reproduction app, app executing unit 305 executes moving picture reproduction processing. App executing unit 305 includes app image providing unit 306.

App image providing unit 306 provides an image (app image) prepared to be displayed on a screen of the started app (app realizing app executing unit 305) to a display control unit (full-screen display control unit 100 or split-screen display control unit 314 described later) that performs control for displaying the app image. App image providing unit 306 stores, for example, the storage location where the app image is stored and informs the display control unit of the storage location to provide the app image. Note that app image providing unit 306 may store the app image itself and provide the app image by reading out the stored app image.

App image providing unit 306 provides the app image to full-screen display control unit 100, for example. Full-screen display control unit 100 displays the provided app image as an image of the started app in a full-screen area. Full-screen display control unit 100 performs control for displaying app images in respective full-screen areas of first screen 11 and second screen 21. Full-screen display control unit 100 includes first screen display control unit 101 and second screen display control unit 102.

First screen display control unit 101 displays an image of an app that is started by a starting operation corresponding to first screen 11, in the full-screen area of first screen 11. For example, when a starting operation of an app is performed on a startup image (menu image G1 or app list image G2) displayed on first screen 11, first screen display control unit 101 determines that a starting operation corresponding to first screen 11 has been performed, and displays an app image in the full-screen area of first screen 11.

Second screen display control unit 102 displays an image of an app that is started by a starting operation corresponding to second screen 21, in the full-screen area of second screen 21. For example, when a starting operation of an app is performed on a startup image (menu image G1 or app list image G2) displayed on second screen 21, second screen display control unit 102 determines that a starting operation corresponding to second screen 21 has been performed, and displays an app image in the full-screen area of second screen 21.

Note that simultaneous display of a plurality of app images in different display areas, such as display of app images on each of first screen 11 and second screen 21 is called "multi-window display," and will be simply referred to below as "multi display". When multi display is to be performed, special processing other than control by first screen display control unit 101 and second screen display control unit 102 is performed, and a detailed description thereof will be given later.

Figure 6:
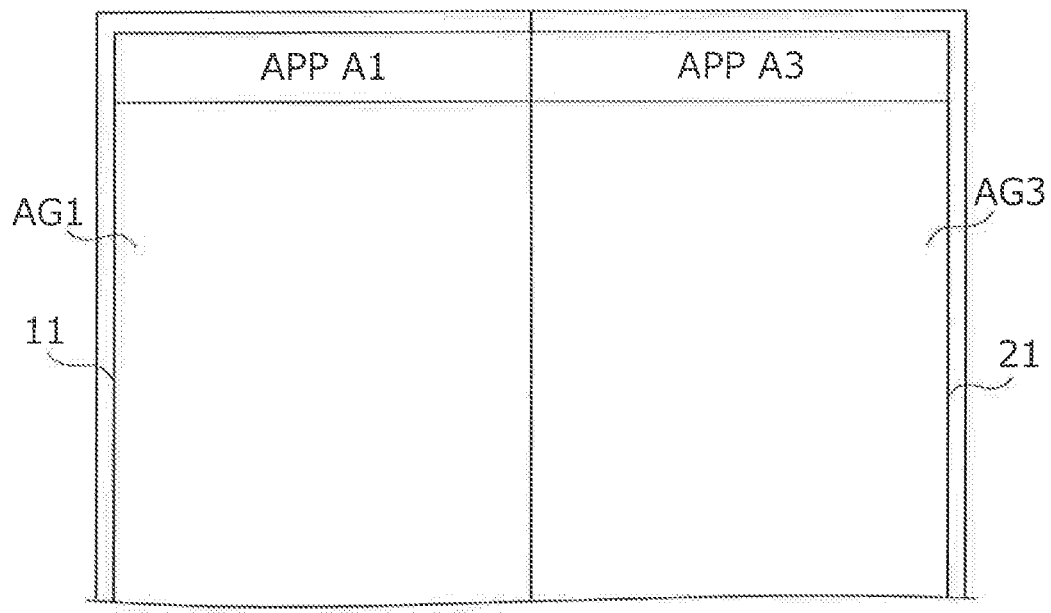
FIG. 6 is a diagram illustrating an example of app images displayed on two screens.

FIG. 6 illustrates app images displayed on two screens. In the example of FIG. 6, first screen display control unit 101 displays app image AG1, which is an image of app A1, in the full-screen area of first screen 11, and second screen display control unit 102 displays app image AG3, which is an image of app A3, in the full-screen area of second screen 21. In this case, app A1 started through menu image G1 displayed on first screen 11 is an example of a "first application" in the present invention, and app A3 started through app list image G2 displayed on second screen 21 is an example of a "second application" in the present invention.

For example, when an ending operation of an app (operation for ending the app) is performed on displayed app image AG1, app ending operation accepting unit 311 accepts the operation as an ending operation of app A1. Upon accepting the ending operation, app ending operation accepting unit 311 supplies, to app ending control unit 312, the app ID for identifying app A1 for which the ending operation was accepted. App ending control unit 312 stores data, parameters, or the like required for app A1 identified using the supplied app ID and ends app A1.

App starting control unit 304 supplies the app ID of the started app and a thumbnail image of the app image to started app information holding unit 313. App ending control unit 312 supplies the app ID of the ended app to started app information holding unit 313. Started app information holding unit 313 holds the app ID and the thumbnail image supplied from app starting control unit 304 as information (app information) regarding the started app, and deletes the app information including the app ID when the held app ID is supplied from app ending control unit 312.

Split-screen display control unit 314 splits a screen into a plurality of display areas and displays app images in the plurality of display areas, respectively. Split-screen display control unit 314 is a function that is included in the OS (function realized by the OS) of smartphone 1. Display of app images by split-screen display control unit 314 is referred to as "split-screen display". Split-screen display is one type of the above-described multi-window display. In smartphone 1, split-screen display is only performed on first screen 11 in the state of fully closed style.

Menu image G1 includes a start button for split-screen display, and when a pressing operation is performed by the user on this start button, split-screen display operation accepting unit 315 accepts the operation as a starting operation for split-screen display and notifies split-screen display control unit 314 that the starting operation has been accepted. Upon receiving this notification, split-screen display control unit 314 splits first screen 11 into two display areas.

Figure 7A:
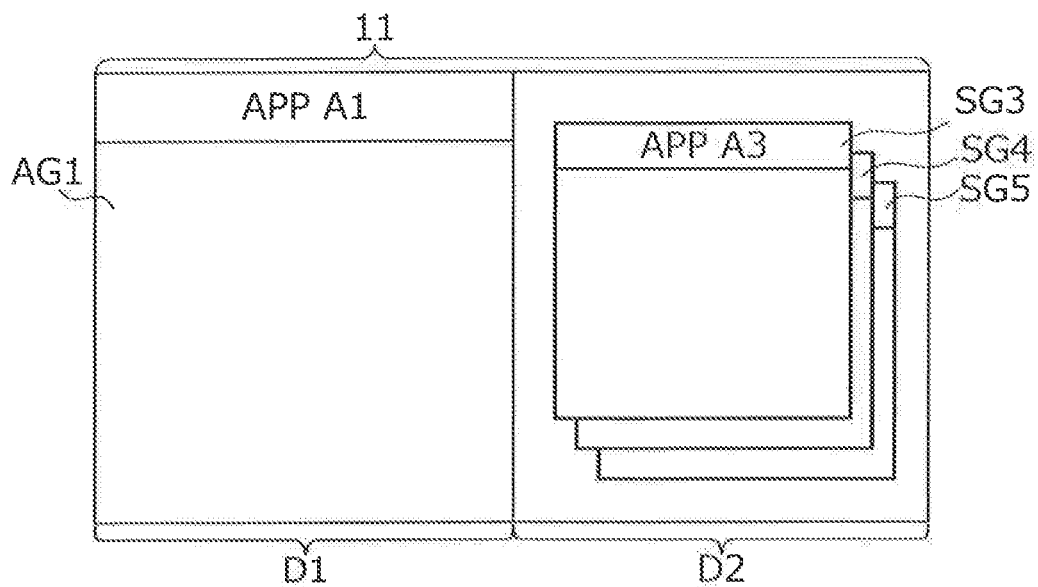
FIG. 7A is a diagram illustrating an example of split display areas (split areas).
Figure 7B:
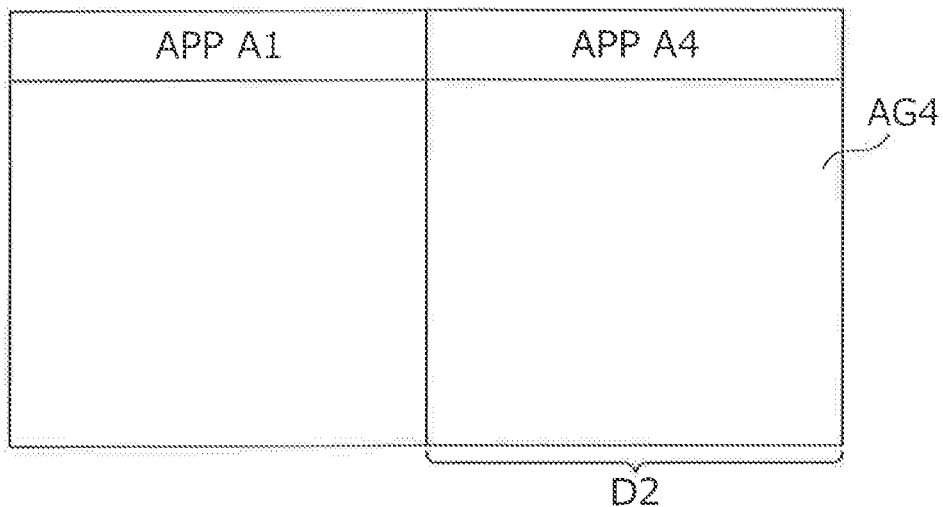
FIG. 7B is a diagram illustrating an example of split display areas (split areas).
Figure 7C:
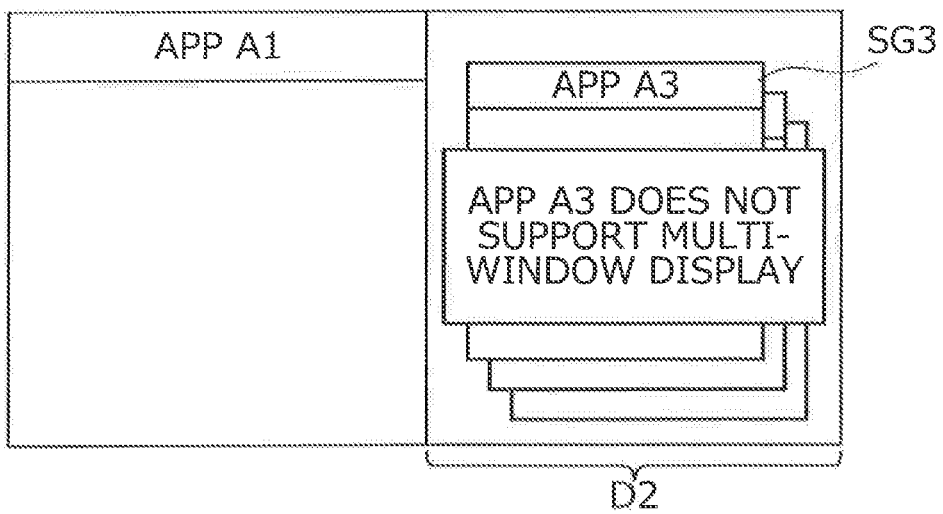
FIG. 7C is a diagram illustrating an example of split display areas (split areas).

FIGS. 7A, 7B, and 7C illustrate an example of split display areas (split areas). In the example of FIGS. 7A, 7B, and 7C, split-screen display control unit 314 splits first screen 11 into first split area D1 and second split area D2. Split-screen display control unit 314 displays, in first split area D1, an app image (in this example, app image AG1 of app A1) that was displayed on first screen 11 before an operation for split-screen display was performed.

Also, split-screen display control unit 314 refers to started app information holding unit 313 and reads out app information regarding started apps, and displays, in second split area D2, thumbnail images (in this example, thumbnail images SG3, SG4, and SG5 of apps A3, A4, and A5) of apps other than the app displayed in first split area D1. When an operation for selecting any of the thumbnail images is performed by the user, split-screen display operation accepting unit 315 accepts this operation as a selection operation of an app image to be displayed in the split area.

When the selection operation is accepted by split-screen display operation accepting unit 315, split-screen display control unit 314 displays, in second split area D2, the app image (in this example, app image AG4 of app A4) selected by the selection operation. Here, it is noted that there are apps that support multi-window display such as split-screen display (hereinafter referred to as "supporting applications" or simply as "supporting apps") and apps that do not support multi-window display (hereinafter referred to as "non-supporting applications" or simply as "non-supporting apps").

Split-screen display control unit 314 displays the app image of a supporting app (app A4 in the example of FIGS. 7A, 7B, and 7C) in the split area as in the example of FIGS. 7A, 7B, and 7C. In contrast, split-screen display control unit 314 does not display the app image of a non-supporting app (app A3 in the example of FIGS. 7A, 7B, and 7C) in the split area and, when, for example, an operation for selecting thumbnail image SG3 of app A3 is performed, displays a message saying that app A3 is a non-supporting app, in second split area D2 as illustrated in FIG. 7C.

Whether the started app is a supporting app or a non-supporting app is made clear by app executing unit 305. App executing unit 305 includes multi-display support processing unit 307. App executing unit 305, which is realized by the started app, acquires screen information regarding the screen on which the app image is to be displayed from OS executing unit 301. Screen information is information that indicates the size of the screen, the number of screens, and the like.

In the state of fully closed style, OS executing unit 301 supplies screen information that indicates that there is only a single screen, that is, first screen 11. Note that a measured hinge angle is supplied to OS executing unit 301 from hinge angle measuring unit 302, and OS executing unit 301 determines the current style of smartphone 1 based on the supplied hinge angle. In the state of a style other than the fully closed style (for example, tent style), OS executing unit 301 supplies screen information that indicates that there are two screens, that is, first screen 11 and second screen 21. Acquired screen information is supplied to multi-display support processing unit 307.

Multi-display support processing unit 307 performs no operations when it receives screen information indicating that there is only a single screen, and performs no operations even when it receives screen information indicating that there are a plurality of screens if the started app (app realizing app executing unit 305 including the function of multi-display support processing unit 307) supports multi display. Therefore, in these cases, split-screen display control unit 314 performs split-screen display as illustrated in FIGS. 7A and B.

However, when multi-display support processing unit 307 receives screen information indicating that there are a plurality of screens and the started app does not support multi display, multi-display support processing unit 307 creates a non-support notification that indicates that the app is a non-supporting app and that makes a request not to display the app image, and supplies the created non-support notification to split-screen display control unit 314, for example. Upon receiving the non-support notification from the non-supporting app, split-screen display control unit 314 performs control so as not to display the app image of the non-supporting app in the above-described split areas (first split area D1 and second split area D2).

For example, if split-screen display control unit 314 received the non-support notification from multi-display support processing unit 307 of the non-supporting app, split-screen display control unit 314 does not read out the app image from the storage location even if it has been informed of the storage location from app image providing unit 306 of the non-supporting app, and thus the app image will not be displayed. Split-screen display control unit 314 is an example of a "display control function" in the present invention.

On the other hand, when full-screen display control unit 100 performs multi-window display on first screen 11 and second screen 21, multi-display support processing unit 307 performs different operations. After starting an app, app starting control unit 304 supplies the app ID of the started app to full-screen display control unit 100. Upon receiving the app ID, full-screen display control unit 100 requests the hinge angle from hinge angle measuring unit 302 and acquires the hinge angle as a response to the request.

Full-screen display control unit 100 includes multi-display support control unit 103. Multi-display support control unit 103 determines the current style of smartphone 1 based on the acquired hinge angle. If the current style is determined as being the fully closed style, multi-display support control unit 103 performs no operations. If the current style is determined as being a style other than the fully closed style, multi-display support control unit 103 instructs multi-display support processing unit 307 included in app executing unit 305 indicated by the supplied app ID to cancel supply of the non-support notification to full-screen display control unit 100.

Upon receiving this instruction, multi-display support processing unit 307 cancels creation of the non-support notification or cancels supply of a created non-support notification to full-screen display control unit 100. Since first screen display control unit 101 and second screen display control unit 102 of full-screen display control unit 100 do not receive the non-support notification, first screen display control unit 101 or second screen display control unit 102 reads out the app image from the storage location informed by app image providing unit 306 of the non-supporting app, and displays the app image of the non-supporting app. As described above, full-screen display control unit 100 performs control so as not to receive the non-support notification when the non-support app is started and displays the image of the non-supporting app on first screen 11 or second screen 21.

Based on the above-described configuration, smartphone 1 performs multi-display processing for displaying app images on two screens, respectively.

Figure 8:
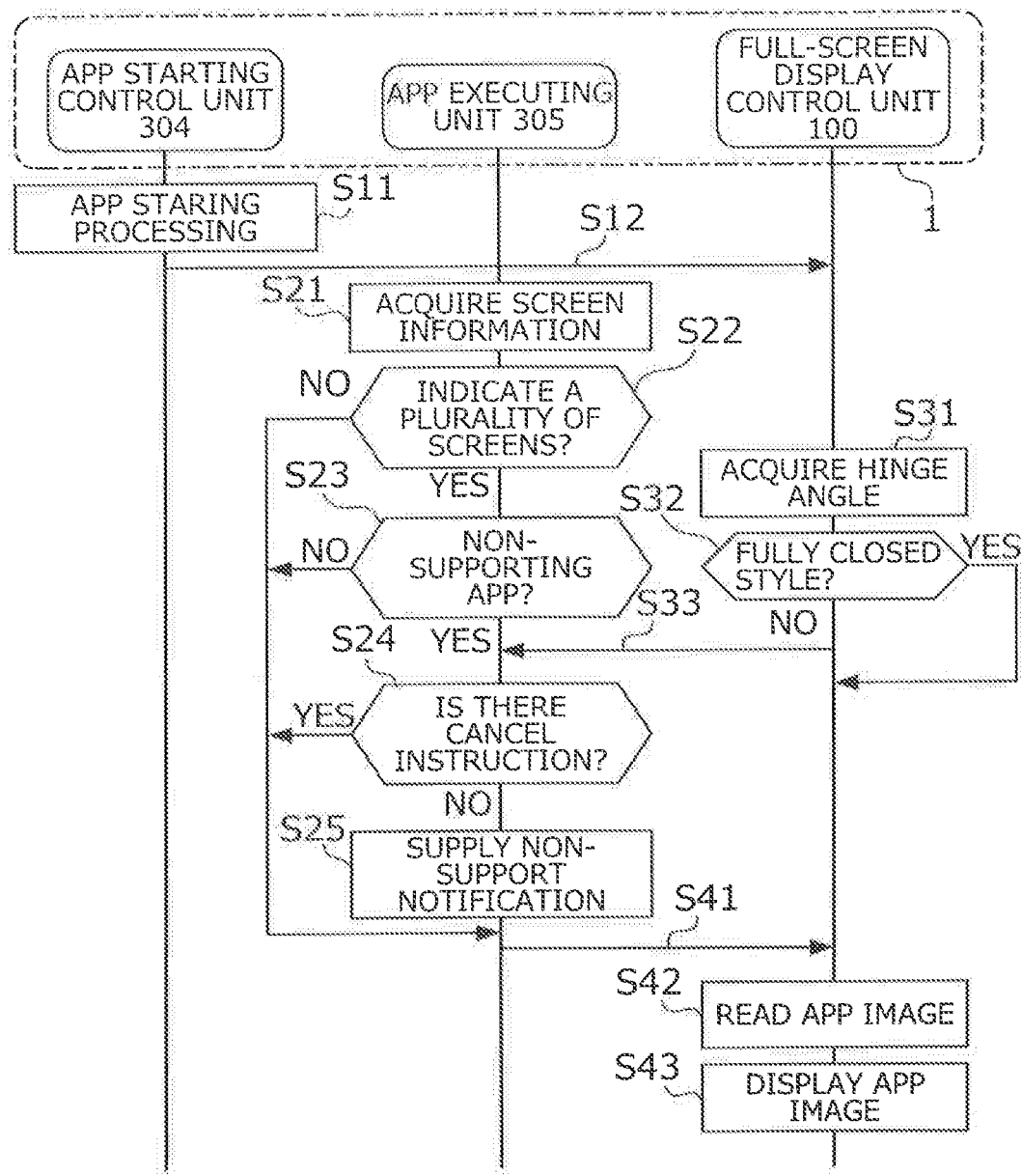
FIG. 8 is a diagram illustrating an example of an operation procedure in multi-display processing.

FIG. 8 illustrates an example of an operation procedure in the multi-display processing. This operation is started, for example, upon a starting operation of an app being performed by the user. First, smartphone 1 (app starting control unit 304) performs starting processing for starting the app for which the starting operation was performed (step S11).

Next, smartphone 1 (app starting control unit 304) supplies the app ID of the started app to full-screen display control unit 100 (step S12). Subsequently, smartphone 1 (app executing unit 305) acquires screen information regarding the screen on which the app image is to be displayed (step S21). Next, smartphone 1 (app executing unit 305) determines whether or not the acquired screen information indicates a plurality of screens (step S22).

If the current style is a style other than the fully closed style, it is determined, in step S22, that the screen information indicates a plurality of screens (YES), and accordingly, smartphone 1 (app executing unit 305) next determines whether or not the app is a non-supporting app (app that does not support multi-window display) (step S23). If it is determined, in step S23, that the app is a non-supporting app (YES), smartphone 1 (app executing unit 305) determines whether or not a cancel instruction for the non-support notification has been made (step S24). This cancel instruction is made by the following operation.

Upon receiving the app ID, smartphone 1 (full-screen display control unit 100) acquires the measured current hinge angle from hinge angle measuring unit 302 (step S31). Next, smartphone 1 (full-screen display control unit 100) determines whether or not the style indicated by the hinge angle is the fully closed style (step S32), and if it is determined that the style is not the fully closed style (NO), makes the cancel instruction for the non-support notification to app executing unit 305 (step S33), and if it is determined that the style is the fully closed style (YES), does not make the cancel instruction.

If it is determined, in step S24, that the cancel instruction was not made (NO), smartphone 1 (app executing unit 305) supplies the non-support notification to split-screen display control unit 314 (step S25). This prevents split-screen display of the app image of the non-supporting app. In contrast, smartphone 1 (app executing unit 305) informs full-screen display control unit 100 of the storage location of the app image (step S41) in the following three cases.

The smartphone 1 (app executing unit 305) makes the storage location known in the cases where it is determined, in step S22, that the screen information does not indicate a plurality of screens (i.e., when the current style is the fully closed style), it is determined, in step S23, that the app is not a non-supporting app (NO), and it is determined, in step S24, that a cancel instruction was made (YES). Smartphone 1 (full-screen display control unit 100) reads out the app image from the storage location (step S42) and displays the app image on first screen 11 or second screen 21 (step S43).

In the present embodiment, the app image of an app is displayed on first screen 11 or second screen 21 upon the app being started, as described above. That is, when images of two applications are to be displayed simultaneously on first screen 11 and second screen 21, it is only necessary to perform operations for starting the applications on the respective screens.

In contrast, in the case of split-screen display, for example, it is necessary to initially perform operations for starting apps a plurality of times in advance. In addition, it is necessary to perform an operation for splitting a screen into a plurality of display areas (split areas) and an operation for selecting apps to be displayed in the split areas. As compared with split-screen display as described above, the present embodiment can reduce inconvenience when images of two applications are to be displayed simultaneously.

Also, in the present embodiment, if a starting operation is performed on a startup image displayed on first screen 11, the app image of the started app is displayed on first screen 11, and if a starting operation is performed on a startup image displayed on second screen 21, the app image of the started app is displayed on second screen 21. Therefore, the user can intuitively select the screen on which the app image of the started app is to be displayed.

Further, in the present embodiment, startup images are automatically displayed when the hinge angle becomes larger than the predetermined angle, and therefore inconvenience that the user might feel when starting an app can be reduced as compared with a case where operations for displaying the startup images are necessary. Also, in the present embodiment, even if an app is a non-supporting app that does not support multi-window display, it is possible to simultaneously display images on first screen 11 and second screen 21 by cancelling the non-support notification as described above.

2. Variations

The above-described embodiment is merely an example of embodiments of the present invention, and can be modified as described below.

2-1. Selection Method of App Image Display Screen

In the embodiment, the screen on which the startup image is displayed is determined as being the screen on which the app image is to be displayed. However, the method for selecting the screen for displaying the app image is not limited to this method. For example, when an app that is associated with first screen 11 is started, full-screen display control unit 100 displays the app image of the app on first screen 11.

The app associated with first screen 11 is, for example, a telephone app. This is because the telephone app is more convenient when it is displayed on first screen 11 including speaker port 12. For example, full-screen display control unit 100 stores a list of app IDs that indicate apps associated with first screen 11, and when the app ID of the started app is supplied from app starting control unit 304, first screen display control unit 101 displays the app image of the app on first screen 11 if the supplied app ID is included in the list.

If the supplied app ID is not included in the list, full-screen display control unit 100 displays the app image on the screen on which the startup image was displayed, similarly to the embodiment. Note that an app may be associated with second screen 21, rather than first screen 11. In such a case, when an app associated with second screen 21 is started, full-screen display control unit 100 displays the app image of the app on second screen 21.

The app associated with second screen 21 is, for example, a telephone directory app. This is because the telephone directory app is often used together with the telephone app, and therefore the telephone directory app is more convenient when it is displayed on second screen 21 while the telephone app is displayed on first screen 11. In this variation, even when, for example, an operation for starting the telephone app is performed on the startup image displayed on second screen 21, the app image of the telephone app is displayed on first screen 11.

Similarly, even when an operation for starting the telephone directory app is performed on the startup image displayed on first screen 11, the app image of the telephone directory app is displayed on second screen 21. According to this variation, in the case where an app is more convenient when it is displayed on first screen 11 and another app is more convenient when it is displayed on second screen 21, these apps can be displayed on the respective screens regardless of whether operations for starting the apps are performed on first screen 11 or second screen 21, as described above.

2-2. App Image Moving Operation

It is possible to employ a configuration in which the app image can be moved between screens after the app image is displayed. For example, an operation of dragging the app image to the adjacent screen with two fingers is used as an app image moving operation, in order to avoid confusion with other operations.

Figure 9A:
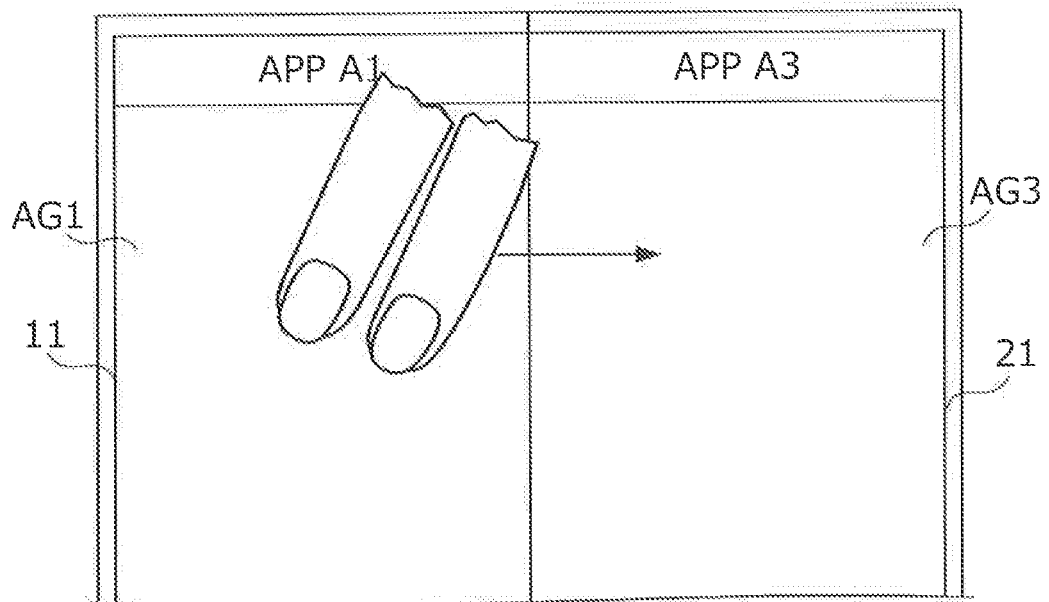
FIG. 9A is a diagram illustrating an example of an app image moving operation.
Figure 9B:
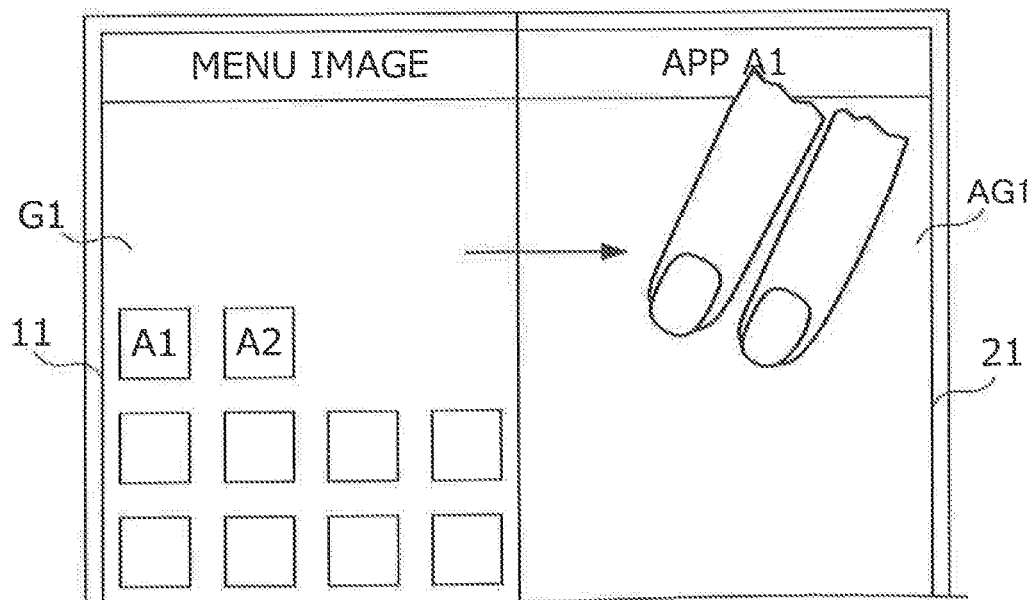
FIG. 9B is a diagram illustrating an example of an app image moving operation.

FIGS. 9A and 9B illustrate an example of the app image moving operation. In FIG. 9A, app image AG1 of app A1 is displayed on first screen 11 by full-screen display control unit 100 (first screen display control unit 101), and app image AG3 of app A3 is displayed on second screen 21 by full-screen display control unit 100 (second screen display control unit 102).

When the user touches the region of first screen 11 where app image AG1 is displayed with two fingers and moves the two fingers to second screen 21 while touching the screen, display is changed as illustrated in FIG. 9B. In FIG. 9B, menu image G1 is displayed on first screen 11 by startup image display control unit 200 (first startup image display control unit 201), and app image AG1 of app A1 is displayed on second screen 21 by full-screen display control unit 100 (second screen display control unit 102).

As described above, in the state where an app image is displayed on one of first screen 11 and second screen 21 (first screen 11 in the example of FIGS. 9A and 9B), when the moving operation is performed by the user by indicating two points on the one screen and moving the two points from the one screen to another screen (second screen 21 in the example of FIGS. 9A and 9B), full-screen display control unit 100 displays the app image on the other screen and no longer displays the app image on the one screen.

For example, when the user wants to display app image AG1 on second screen 21 and start another app on first screen 11 in the state of FIG. 9A, if the above-described moving operation is not available, it is necessary to display a startup image on second screen 21 and then start app A1, and if an operation has been already performed on app A1 (for example, in a case where app A1 is a browser, an operation for displaying a website, or the like), it is necessary to perform the same operation to display the same image. As compared with such a case, when display can be performed through the above-described moving operation, the user can be relieved from inconvenience.

In the example of FIGS. 9A and 9B, upon the moving operation being performed, startup image display control unit 200 displays the startup image on the one screen (first screen 11 in the example of FIGS. 9A and 9B) from which the app image has been moved by the moving operation. As a result, an app starting operation can be immediately performed on the screen from which the app image has been moved, and the user can be relieved from inconvenience as compared with a case where an operation for displaying operation images is required after the moving operation is performed.

Note that the moving operation may be performed with one or three or more fingers rather than two fingers, so long as the user indicates one or more positions on the one screen and moves the indicated positions from the one screen to the other screen. Note that when the moving operation is an operation of moving a single point (single position) with a finger, the moving operation may be accepted as another operation (for example, an icon dragging operation).

Therefore, the moving operation is preferably an operation of the user indicating two or more points (two or more positions) and moving the two or more points from one screen to another screen. When a touch screen that detects an indicated position in a non-contact state is used, the user's finger need not be in contact with the screen. Further, although the app image is moved from first screen 11 to second screen 21 by the moving operation in the example of FIGS. 9A and 9B, the app image may also be moved from second screen 21 to first screen 11.

Also, full-screen display control unit 100 may display, on the screen from which the app image has been moved, an app image that was displayed on the screen before the moved app image. In this case, app images that have been displayed on the screen are sequentially displayed when the moving operation is repeatedly performed, and inconvenience that the user might feel when using a previously used app again can be reduced as compared with a case where such display control is not performed.

2-3. Free Selection of App Image Display Screen

Although an app associated with a screen is started in the above-described variation, when, for example, a predetermined starting operation is performed on a startup image displayed on one screen, full-screen display control unit 100 may display the app image of the started app on another screen even if the app is not associated with the other screen.

The predetermined starting operation may be, for example, an operation of touching a shortcut or an icon with two fingers (or three or more fingers), moving the fingers to another screen while touching the screen, and then separating the fingers therefrom. In this case, when the startup image is not displayed on the screen on which the user wants to display the app image, it is possible to display the app image on the desired screen right after the app is started, by using the startup image that is displayed on the other screen.

2-4. Method for Preventing Display of Non-Supporting App

Multi-display support control unit 103 may realize display of non-supporting apps on two screens using a method other than that in the embodiment. It is assumed, for example, that split-screen display of the app image of a non-supporting app is not performed since multi-display support processing unit 307 supplies the non-support notification to split-screen display control unit 314 and instructs app image providing unit 306 to stop providing the app image to split-screen display control unit 314 and app image providing unit 306 does not inform split-screen display control unit 314 of the storage location of the app image in accordance with this instruction.

In this case, multi-display support control unit 103 instructs multi-display support processing unit 307 to cancel the stop instruction to app image providing unit 306. As a result of multi-display support processing unit 307 cancelling the stop instruction in accordance with this instruction, the app image is provided by app image providing unit 306 and displayed on the two screens by full-screen display control unit 100. As described above, although various methods can be employed for preventing multi-window display of a non-supporting app using the function of the OS, regardless of which method is employed, processing for displaying app images respectively on first screen 11 and second screen 21 can be performed by multi-display support control unit 103.

2-5. Joint Portion

Although hinge 30 of smartphone 1 rotatably joins first casing 10 and second casing 20 such that the hinge angle changes from 0 degrees to 180 degrees, the joining may be such that the hinge angle changes from 0 degrees to 360 degrees or in any range therebetween. Also, although in the embodiment, hinge 30 joins first casing 10 and second casing 20 such that first screen 11 and second screen 21 face outward when the hinge angle is 0 degrees, conversely, first casing 10 and second casing 20 may be joined such that first screen 11 and second screen 21 face inward when the hinge angle is 0 degrees.

2-6. Category of Invention

The present invention is applicable not only to a smartphone but also to a tablet terminal, for example. The present invention is applicable to any display apparatus that has two screens and realizes the functions illustrated in FIG. 4. The present invention can be interpreted as an information processing method for realizing processing executed by a display apparatus, or a program for causing operation of a computer that controls a display apparatus, as well as the display apparatus as described above. This program may be provided in the form of a storage medium such as an optical disk storing the program, or may be provided as a program that is to be downloaded to a computer via a network such as the Internet and is available when it is installed.

2-7. Processing Procedure and the Like

The processing procedure, sequence, flowchart, and the like described in the present specification may be performed in a different order so long as no contradiction is incurred.

For example, in the present specification, elements of various steps of the method are described in illustrative order, and the described order should not be taken as a specific limitation.

2-8. Handling of Input or Output Information and the Like

Input or output information and the like may be stored in a predetermined location (for example, a memory) or may be managed using a management table. Input or output information and the like can be overwritten or updated, or information may be added thereto. Output information and the like may be deleted. Input information and the like may be transmitted to another apparatus.

2-9. Software

Regardless of whether software is called software, firmware, middleware, microcode, hardware description language, or any other name, it should be widely interpreted to mean instruction, instruction set, code, code segment, program code, program, subprogram, software module, application, software application, software package, routine, subroutine, object, executable file, execution thread, procedure, function, and the like.

Also, software, instructions, and the like may be transmitted or received via a transmission medium. For example, when software is transmitted from a website, a server, or another remote source using cable technology such as a coaxial cable, an optical fiber cable, a twisted-pair wire, or a digital subscriber line (DLS) and/or wireless technology such as infrared waves, radio waves, or microwaves, the cable technology and/or wireless technology are encompassed by the definition of the transmission medium.

2-10. Information and Signal

Information, signal, and the like described in the present specification may be expressed using any of various techniques. For example, data, instruction, command, information, signal, bit, symbol, chip, and the like that may be referred to in the entire description given above may be expressed with voltage, current, electromagnetic waves, electric field or magnetic particles, photo field or photons, or any combination of these.

2-11. Meaning of "Based On"

The phrase "based on" used in the present specification does not mean "only based on" unless otherwise stated. In other words, the phrase "based on" can mean both "only based on" and "at least based on".

2-12. "And" and "Or"

In the present specification, when a configuration can be implemented by either "A and B" and "A or B", a configuration described with one of these phrases may be used as a configuration described with another of these phrases. For example, when a configuration is described with the phrase "A and B", the phrase "A and B" may be replaced with the phrase "A or B" so long as the configuration can be implemented without inconsistency with other descriptions being incurred.

2-13. Variations or the Like of Embodiment

Each embodiment described in the present specification may be used alone or in combination, or may be switched in accordance with execution. Also, notification of predetermined information (for example, notification of "X") is not limited to explicit notification, and can be made implicitly (for example, by not giving the notification of the predetermined information).

Although the present invention has been described in detail, it is clear for a person skilled in the art that the present invention is not limited to the embodiment described in the present specification. The present invention can be carried out with modifications and alterations not departing from the gist and scope of the present invention that are defined by the claims. Therefore, the descriptions in the present specification are only illustrative, and do not have any meaning that limit the present invention.

REFERENCE SIGNS LIST

1 . . . Smartphone
10 . . . First casing
11 . . . First screen
20 . . . Second casing
21 . . . Second screen
30 . . . Hinge
100 . . . Full-screen display control unit
101 . . . First screen display control unit
102 . . . Second screen display control unit
103 . . . Multi-display support control unit
200 . . . Startup image display control unit
201 . . . First startup image display control unit
202 . . . Second startup image display control unit
301 . . . OS executing unit
302 . . . Hinge angle measuring unit
303 . . . App starting operation accepting unit
304 . . . App starting control until
305 . . . App executing unit
306 . . . App image providing unit
307 . . . Multi-display support processing unit
311 . . . App ending operation accepting unit
312 . . . App ending control unit
313 . . . Started app information holding unit
314 . . . Spilt-screen display control unit
315 . . . Split-screen display operation accepting unit

What is claimed is:

1. A display apparatus comprising:
a first screen;
a second screen;
a first display control unit that displays an image of a first application on the first screen upon the first application being started, and displays an image of a second application on the second screen upon the second application being started; and
an executing unit that executes an operation system that realizes a display control function that displays images of applications in a plurality of display areas of at least one of the first screen and the second screen, respectively, and does not display an image of a non-supporting application in the plurality of display areas when a non-support notification is received from the non-supporting application, the non-supporting application being an application that does not support display in the plurality of display areas, and the non-support notification indicating that the non-supporting application does not support display in the plurality of display areas,
wherein, when the non-supporting application is started, the first display control unit performs control so as not to receive the non-support notification and displays the image of the non-supporting application on the first screen or the second screen.

2. The display apparatus according to claim 1, further comprising:
a second display control unit that displays at least one startup image for starting an application,
wherein the first display control unit displays an image of an application that is started by a starting operation corresponding to the first screen as the image of the first application on the first screen, and displays an image of an application that is started by a starting operation corresponding to the second screen as the image of the second application on the second screen.

3. The display apparatus according to claim 2, wherein the second display control unit displays a first startup image that is one of the at least one startup image on the first screen, and displays a second startup image that is one of the at least one startup image on the second screen, and when a starting operation is made on the first startup image, the first display control unit determines that the starting operation corresponding to the first screen has been made, and when a starting operation is made on the second startup image, the first display control unit determines that the starting operation corresponding to the second screen has been made.

4. The display apparatus according to claim 2, further comprising:
a first casing that has the first screen;
a second casing that has the second screen; and
a joint portion that joins the first casing and the second casing in a foldable manner,
wherein the second display control unit displays the at least one startup image when the first casing and the second casing are opened wider than a predetermined angle therebetween.

5. The display apparatus according to claim 1,
wherein, when an application associated with the first screen is started, the first display control unit displays an image of the application as the image of the first application on the first screen.

6. The display apparatus according to claim 1,
wherein, in a state where an image of an application is displayed on one of the first screen and the second screen, when a moving operation is performed by a user by indicating a position on the one screen and moving the indicated position from the one screen to another screen, the first display control unit displays the image on the other screen and no longer displays the image on the one screen.

7. The display apparatus according to claim 6, further comprising:

a second display control unit that displays a startup image for starting an application on the one screen from which the image of the application has been moved by the moving operation.

8. The display apparatus according to claim 1, wherein when the non-supporting application is started, the first display control unit performs control so as not to receive the non-support notification and displays the image of the non-supporting application on a full-screen of the first screen or the second screen.

9. The display apparatus according to claim 1, wherein when the non-supporting application is started and the first casing and the second casing are opened wider than a predetermined angle therebetween, the first display control unit performs control so as not to receive the non-support notification and displays the image of the non-supporting application on the first screen or the second screen.

10. A display method implemented by a display apparatus that includes a first screen and a second screen, the method comprising:
displaying an image of a first application on the first screen upon the first application being started, and displaying an image of a second application on the second screen upon the second application being started; and
executing an operation system that realizes a display control function that displays images of applications in a plurality of display areas of at least one of the first screen and second screen, respectively, and does not display an image of a non-supporting application in the plurality of display areas when a non-support notification is received from the non-supporting application, the non-supporting application being an application that does not support display in the plurality of display areas, and the non-support notification indicating that the non-supporting application does not support display in the plurality of display areas,
wherein, when the non-supporting application is started, the first display control unit performs control so as not to receive the non-support notification and displays the image of the non-supporting application on the first screen or the second screen.

* * * * *